United States Patent
Kanehira et al.

[11] Patent Number: 5,902,203
[45] Date of Patent: May 11, 1999

[54] SILENT CHAIN

[75] Inventors: Makoto Kanehira, Iruma; Takero Nakagawa, Osaka; Yutaka Uchiumi, Kawagoe; Masahiro Sato, Oita; Nobuyuki Fujimoto; Hitoshi Ohara, both of Iruma; Masao Maruyama, Hanno, all of Japan

[73] Assignee: Tsubakimoto Chain Co., Osaka-fu, Japan

[21] Appl. No.: 08/892,392

[22] Filed: Jul. 14, 1997

[30] Foreign Application Priority Data

Jul. 16, 1996 [JP] Japan .................................. 8-185994

[51] Int. Cl.⁶ ............................. F16G 13/04; F16G 13/02
[52] U.S. Cl. ........................... 474/213; 474/212; 474/228
[58] Field of Search ..................... 474/201, 202, 474/206, 210, 212, 213, 214, 215, 216, 217, 226, 228, 229, 230, 231, 233

[56] References Cited

U.S. PATENT DOCUMENTS 5,154,674 10/1992 Avramidis et al. ...................... 474/214
5,176,586  1/1993 Sugimoto ................................ 474/212
5,267,910 12/1993 Maruyama et al. .................... 474/212

*Primary Examiner*—John A. Jeffery
*Assistant Examiner*—Matthew A. Kaness
*Attorney, Agent, or Firm*—Armstrong, Westerman, Hattori, McLeland & Naughton

[57] ABSTRACT

A silent chain is provided in which a plurality of link plates of a certin configuration may have an identification indicator marked on a reference surface thereof at the time connecting pin inserting holes are punched into the link plates in order to ensure the link plates are properly directed in the same direction, are superposed on the connecting pins, and are constituted in a chain-like manner by the connecting pins so that meshing surfaces of the link plates mesh smoothly to prevent any meshing noise.

3 Claims, 2 Drawing Sheets

SILENT CHAIN

FIELD OF THE INVENTION

The present invention relates to a silent chain for a transmission.

DESCRIPTION OF THE RELATED ART

A silent chain may be used for a transmission of a vehicle so as to be endlessly passed between a pair of spaced apart sprockets S1 and S2. A plurality of link plates 1 having teeth T1 and T2 which mesh with teeth (not shown) of the sprockets S1 and S2 are placed one on top of each other on connecting pins P1, P2 to be connected by the connecting pins P1, P2 in an endless chain-like manner.

Guide plates G, which have a pair of connecting pin inserting holes, are mounted on ends of connecting pins externally of the outermost link plate adjacent to a longitudinal direction of the chain to guide meshing between the link plates 1 and the sprockets S1 and S2. A guide plate between two central plates is not shown.

The link plate 1 has a configuration as shown in FIG. 2 and includes a pair of connecting pin inserting holes H1 and H2 formed from the metal link plate by the punch working of a press. The molded link plates 1 are connected by connecting pins P1, P2 in a chain-like manner at random to constitute a silent chain.

Since the link plate 1 is formed from a metal plate by the punch working of a press, a distance D1 between a meshing surface 2 of a meshing tooth T1 of the link plate 1 and one connecting pin inserting hole H1 is not always equal to a distance D2 between a meshing surface or a meshing tooth T2 and the other connecting pin inserting hole H2, as shown in FIG. 2, due to a mounting error between a male die and a female die of a punching die. Therefore, a minor dimensional error occurs between the distances D1 and D2, as shown in FIG. 3.

Accordingly, when the link plates 1 are inserted onto the connecting pins P1, P2 at random to constitute a silent chain, a certain link pin, of a plurality of link plates placed one upon another in one and the same pin-like manner, is sometimes inserted onto the connecting pins with the connecting pin inserting hole H1 located on the left hand as shown in FIG. 3. The other link plate is sometimes inserted onto the connecting pins as shown in FIG. 3 with the wrong side turned out. In other words, with the connecting pin inserting hole H2 located on the left hand side.

In such a case as described above, naturally, the connecting pin inserting hole is placed upon the meshing surfaces of the meshing teeth with the different distances D1 and D2 to form a composite meshing surface having a rugged portion along the connecting pins.

As a result, in meshing with the sprocket teeth, one link plate is meshed with the sprocket teeth and another link plate is not meshed with the sprocket teeth. In other words, one link plate contributed to power transmission and another link plate not contributed to power transmission coexist, whereby a transmission load is concentratedly loaded merely on the link plate contributed to power transmission. This poses the problem that in the tensile strength of the silent chain is reduced and an abrasive elongation of the chain occurs early to give rise to an improper meshing so that a meshing noise results.

SUMMARY OF THE INVENTION

From a viewpoint mentioned above, the present invention overcomes the aforementioned problem by properly directing a reference surface in the direction of the same ends of the connecting pins at the time the connecting pin inserting holes are being punched out of the link plate having meshing teeth, and inserting the reference surface into the connecting pins to constitute a silent chain.

At the time the connecting pin inserting holes of a link plate are being punched, a surface, located at either an upper surface side or a lower surface side of the link plate placed on the die bed, is set as a connecting pin inserting hole punching reference surface. The reference surface is properly directed on the same connecting pins in the direction of the same ends of the connecting pins, whereby the distance from the connecting pins of the link plates placed upon the connecting pins to the meshing surface of the meshing teeth is united to either one of the distances between the connecting pin inserting holes and the outer edge of the left or right meshing surface of the link plate. Therefore, a composite meshing surface in an axial direction of the connecting pins formed on the meshing surfaces of the respective link plates is formed into a facing continuous meshing surface without a rugged portion.

DETAILED DESCRIPTION OF THE INVENTION

Figure 1:
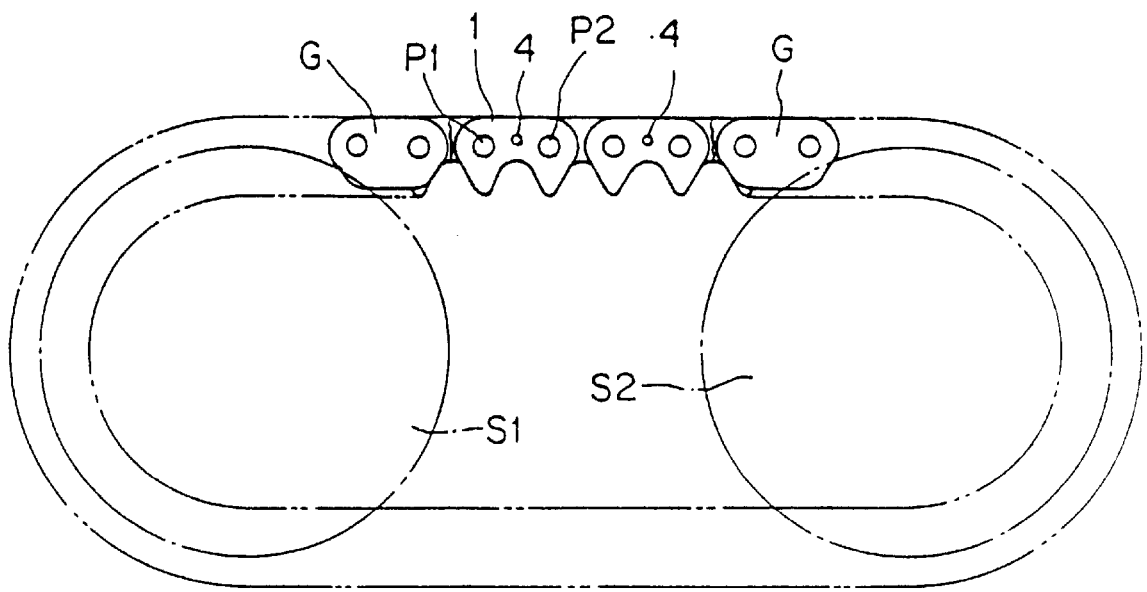
FIG. 1 is a front view illustrating a silent chain according to the present invention.
Figure 2:
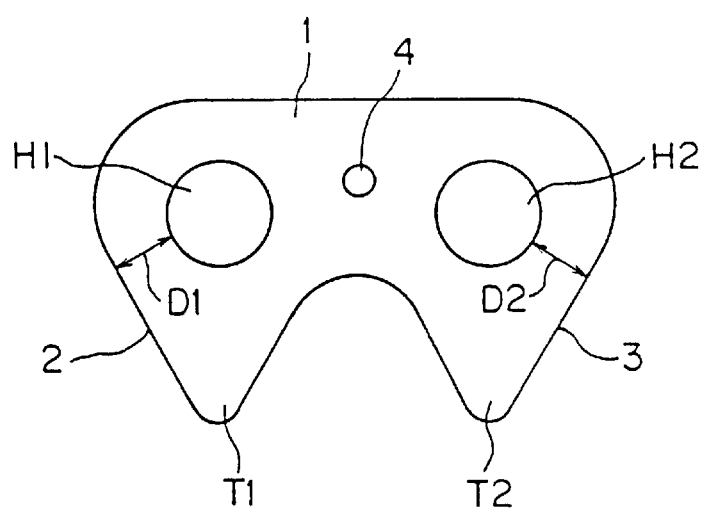
FIG. 2 is an enlarged front view of link plate of the silent chain according to the present invention.
Figure 3:
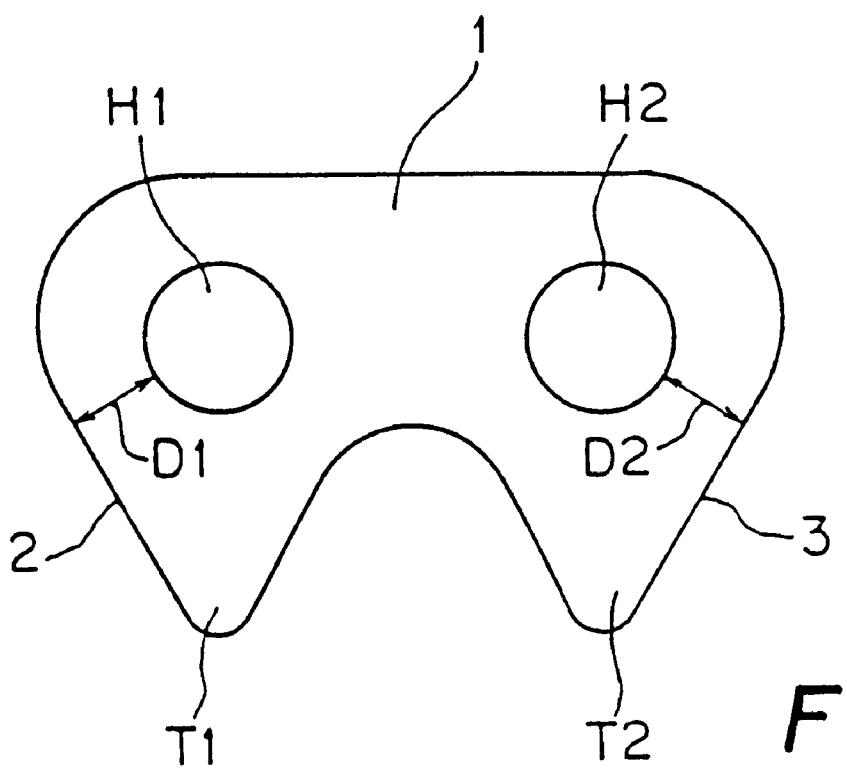
FIG. 3 is an enlarged front view of the silent chain.

FIG. 1 is an explanatory view of the main parts of a guide plate of a silent chain passed over between sprockets in an endless manner with a part omitted; and FIG. 2 is an enlarged front view of a link plate of the silent chain according to the present invention, in which a reference surface identification indication 4 is indicated for a reference surface of a link plate 1.

The reference surface identification indication 4 may be a mark or applied with a reference surface color or pattern.

Further, the connecting pin may be a round pin or a rocker joint pin.

According to the present invention, in the punching work of the configuration of a link plate and connecting pin inserting holes therethrough, either face of said link plate, i.e., either the upper surface or the lower surface when placed on the die bed, is used as a reference surface, and a plurality of the reference surfaces are properly directed outwardly on the connecting pins in the same direction of the ends of the same connecting pins and placed one upon another and connected by the connecting pins in a chain-like manner to constitute a silent chain. Therefore, even if punching positions of a pair of connecting pin inserting holes H1, H2 with respect to meshing surfaces of meshing teeth of the link plates are different from each other, the reference surfaces of a plurality of link plates placed one upon another on the same connecting pins are directed in the same direction and the connecting pins are inserted, whereby all the distances between the meshing surfaces of the plurality of link plates and the same connecting pins are the same on the respective sides. Accordingly, the composite meshing surface in an axial direction of the same connecting pins formed in the meshing surface of the plurality of superimposed link plates faces so that the meshing surfaces of all the link plates are evenly pressed and meshed with the meshing teeth of the sprockets, and the transmission load is evenly loaded. Thus, the tensile strength of the silent chain is not lowered, the abrasive elongation of the chain is suppressed to prevent improper meshing, the meshing noises are reduced and the transmission efficiency is improved.

Since the identification indicator is applied to the reference surface of the link plate whereby the visual confirmation of the reference surface can be done rapidly, the assembling operation of the link plates are executed rapidly and easily when the silent chain is constituted, and the efficiency of the silent chain constituting operation can be promoted.

What is claimed is:

1. A silent chain comprising:

a plurality of link plates are arranged one on top of another so as to be in rows, wherein each link plate of said plurality of link plates has meshing teeth extending therefrom so as to define left and right meshing surfaces, has first and second connecting pin inserting holes therethrough so as to form first and second unequal distances from said left and right meshing surfaces, respectively, and is manufactured by being punched from a metal plate such that a shape of each link plate is symmetrical about a first central axis in a direction of a height of said link plate, but is not symmetrical about a second central axis in a direction of a length of said link plate;

a reference surface of each link plate of said plurality of link plates is arranged in a same direction; and connecting pins for insertion into each connecting pin inserting hole of said plurality of connecting pin inserting holes of each link plate of said plurality of link plates so that a longitudinal axis of said pins is parallel to a direction in which said link plates are punched from said metal plate.

2. The silent chain as in claim 1, further comprising an identification means, applied to said reference surface of each link plate of said plurality of link plates, for identifying a direction in which each link plate of said plurality of link plates should be facing on said connecting pins.

3. A silent chain comprising:

a plurality of link plates arranged one of top of another so as to be in rows, wherein each link of said plurality of link plates has meshing teeth extending therefrom so as to define left and right meshing surfaces, has first and second connecting pin inserting holes therethrough so as to form first and second unequal distances from said left and right meshing surfaces, respectively, and is manufactured by being punched from a metal plate such that a shape of each link plate is symmetrical about a first central axis in a direction of a height of said link plate, but is not symmetrical about a second central axis in a direction of a length of said link plate;

a reference surface of each link plate of said plurality of link plates arranged in a same direction; and connecting pins are inserted in each of said plurality of connecting pin inserting holes of each link plate of said plurality of link plates so that a longitudinal axis of said pins is parallel to a direction in which said link plates are punched from said sheet; and an identification indicator applied to said reference surface of each link plate of punch working of each connecting pin inserting hole of said plurality of connecting pin inserting holes of each link plate of said plurality of link plates, wherein said identification indicator is properly directed in a direction parallel to said direction in which said connecting pins of said silent chain are inserted into said connecting pin inserting holes.

* * * * *